(12) United States Patent
Ekambaram et al.

(10) Patent No.: US 10,728,753 B2
(45) Date of Patent: Jul. 28, 2020

(54) SYSTEM AND METHOD TO PREVENT EAVESDROPPING OF IOT-ENABLED OBJECT-USER INTERACTIONS

(71) Applicant: International Business Machines Corporation, Armonk, NY (US)

(72) Inventors: Vijay Ekambaram, Chennai (IN); Padmanabha Venkatagiri Seshadri, Mysore (IN); Srikanth K. Murali, Bangalore (IN); Aparna Seshadri, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 16/119,105

(22) Filed: Aug. 31, 2018

(65) Prior Publication Data

US 2020/0077257 A1    Mar. 5, 2020

(51) Int. Cl.
*H04L 29/06*    (2006.01)
*H04W 12/02*    (2009.01)
(Continued)

(52) U.S. Cl.
CPC ........... *H04W 12/02* (2013.01); *G06F 21/60* (2013.01); *G06F 21/6245* (2013.01);
(Continued)

(58) Field of Classification Search
None
See application file for complete search history.

(56) References Cited

U.S. PATENT DOCUMENTS 5,319,711 A    6/1994   Servi
5,412,658 A    5/1995   Arnold et al.
(Continued)

OTHER PUBLICATIONS

Megha G. Paserkar et al., "A Review on Distributed Beam Forming Techniques—An Approach in Wireless Relay Networks", International Journal of Research in Engineering and Technology, vol. 3, Issue 11, Nov. 2014, pp. 421-424.
(Continued)

*Primary Examiner* — Andrew J Steinle
(74) *Attorney, Agent, or Firm* — William H. Hartwell; Maxine L. Barasch; Keohane & D'Alessandro PLLC

(57) ABSTRACT

Disclosed embodiments provide techniques for data communication to mobile electronic devices utilizing nodes equipped with directional transmitters. The mobile electronic devices are classified as registered or unregistered. A current location for each mobile electronic device in an area is determined. A registered mobile electronic device is identified from a group of mobile electronic devices. Based on the determined location, a distance to a registered mobile electronic device from a transmitter is determined. The transmitter is a directional transmitter, capable of transmitting along a sector. A sector corresponding to the registered mobile electronic device based on an angle range and distance from a transmitter to the registered mobile electronic device is determined. Data is transmitted to the registered mobile device with directed communication from multiple transmitters, operating to create constructive interference to enable a suitable signal strength at the location of the registered mobile electronic device.

20 Claims, 17 Drawing Sheets

(51) Int. Cl.
| | |
|---|---|
| *H04W 4/33* | (2018.01) |
| *H04W 4/02* | (2018.01) |
| *G06F 21/62* | (2013.01) |
| *G06F 21/60* | (2013.01) |
| *H04W 52/28* | (2009.01) |
| *H04W 4/80* | (2018.01) |
| *H04W 4/38* | (2018.01) |

(52) U.S. Cl.
 CPC ...... *H04L 63/0414* (2013.01); *H04L 63/1425* (2013.01); *H04W 4/025* (2013.01); *H04W 4/33* (2018.02); *H04W 4/38* (2018.02); *H04W 4/80* (2018.02); *H04W 52/283* (2013.01)

(56) References Cited

U.S. PATENT DOCUMENTS

| | | |
|---|---|---|
| 6,603,799 B1 | 8/2003 | Hlasny |
| 7,068,790 B1 | 6/2006 | Elliott |
| 7,603,460 B2 | 10/2009 | Adya et al. |
| 8,204,224 B2 | 6/2012 | Xiao |
| 8,259,672 B2 | 9/2012 | Hochwald et al. |
| 8,260,261 B2 | 9/2012 | Teague |
| 9,143,521 B2 | 9/2015 | Denton et al. |
| 9,800,367 B1* | 10/2017 | Dai .......... H04K 3/825 |
| 2003/0009394 A1* | 1/2003 | Malkin ............ G06Q 20/20 705/27.2 |
| 2016/0124401 A1 | 5/2016 | Li |
| 2017/0091823 A1* | 3/2017 | Adinarayan ....... G06Q 30/0267 |

OTHER PUBLICATIONS

Lin Hu et al., "Coopertive Jamming for Physical Layer Security Enhancement in Internet of Things", IEEE Internet of Things Journal, vol. 5, No. 1, Feb. 2018, pp. 219-228.

Zheng, G. et al., "Rethinking the role of interference in wireless networks", IEEE Communications Magazine 52, No. 11, 2014, 15 pages.

Daniel-Ioan Curic, "Wireless Sensor Network Security Enhancement Using Directional Antennas: State of the Art and Research Challenges", Sensors 16, 488, 2016, 15 pages.

\* cited by examiner

SYSTEM AND METHOD TO PREVENT EAVESDROPPING OF IOT-ENABLED OBJECT-USER INTERACTIONS

FIELD

Embodiments of the invention relate to techniques for data communication to mobile electronic devices utilizing a plurality of nodes equipped with directional transmitters.

BACKGROUND

Smart homes are increasingly deploying Internet-of-Things (IoT)-enabled objects and wearables to capture object-user interactions. However, due to the broadcast wireless medium used, eavesdropping of such interactions could potentially be leveraged in criminal activities such as burglary and identity theft. Therefore, there is a need for protecting space-confined object-user interactions from such malicious activities.

SUMMARY

In one embodiment, there is provided a computer-implemented method for electronic communication, comprising: determining a classification for a plurality of mobile electronic devices as registered or unregistered; determining a current location for each of the plurality of mobile electronic devices; determining a registered mobile electronic device from the plurality of mobile electronic devices; determining a distance to the registered mobile electronic device from a transmitter; determining a sector corresponding to the registered mobile electronic device based on angle range and distance from the transmitter to the registered mobile electronic device; determining if the sector is a safe sector; and in response to determining a safe sector, exchanging safe sector information with one or more neighboring transmitters; obtaining a count of safe sectors for the registered mobile electronic device; computing a transmission signal strength based on the distance and the count of safe sectors; and transmitting data to the registered mobile electronic device with directed communication using the computed transmission signal strength.

In another embodiment, there is provided an electronic communication device comprising: a processor; a directional transmitter coupled to the processor; a memory coupled to the processor, the memory containing instructions, that when executed by the processor, perform the steps of: determining a classification for a plurality of mobile electronic devices as registered or unregistered; determining a current location for each of the plurality of mobile electronic devices; determining a registered mobile electronic device from the plurality of mobile electronic devices; determining a distance to the registered mobile electronic device from a transmitter; determining a sector corresponding to the registered mobile electronic device based on angle range and distance from a transmitter to the registered mobile electronic device; determining if the sector is a safe sector; and in response to determining a safe sector, exchanging safe sector information with one or more neighboring transmitters; obtaining a count of safe sectors for the registered mobile electronic device; computing a transmission signal strength based on the distance and the count of safe sectors; and transmitting data to the registered mobile electronic device via the directional transmitter using the computed transmission signal strength.

In yet another embodiment, there is provided a computer program product for an electronic communication device comprising a computer readable storage medium having program instructions embodied therewith, the program instructions executable by a processor to cause the electronic communication device to perform the steps of: determining a classification for a plurality of mobile electronic devices as registered or unregistered; determining a current location for each of the plurality of mobile electronic devices; determining a registered mobile electronic device from the plurality of mobile electronic devices; determining a distance to the registered mobile electronic device from a transmitter; determining a sector corresponding to the registered mobile electronic device based on angle range and distance from a transmitter to the registered mobile electronic device; determining if the sector is a safe sector; and in response to determining a safe sector, exchanging safe sector information with one or more neighboring transmitters; obtaining a count of safe sectors for the registered mobile electronic device; computing a transmission signal strength based on the distance and the count of safe sectors; and transmitting data to the registered mobile electronic device with directed communication using the computed transmission signal strength.

BRIEF DESCRIPTION OF THE DRAWINGS

Features of the disclosed embodiments will be more readily understood from the following detailed description of the various aspects of the invention taken in conjunction with the accompanying drawings.

Figure 1A:
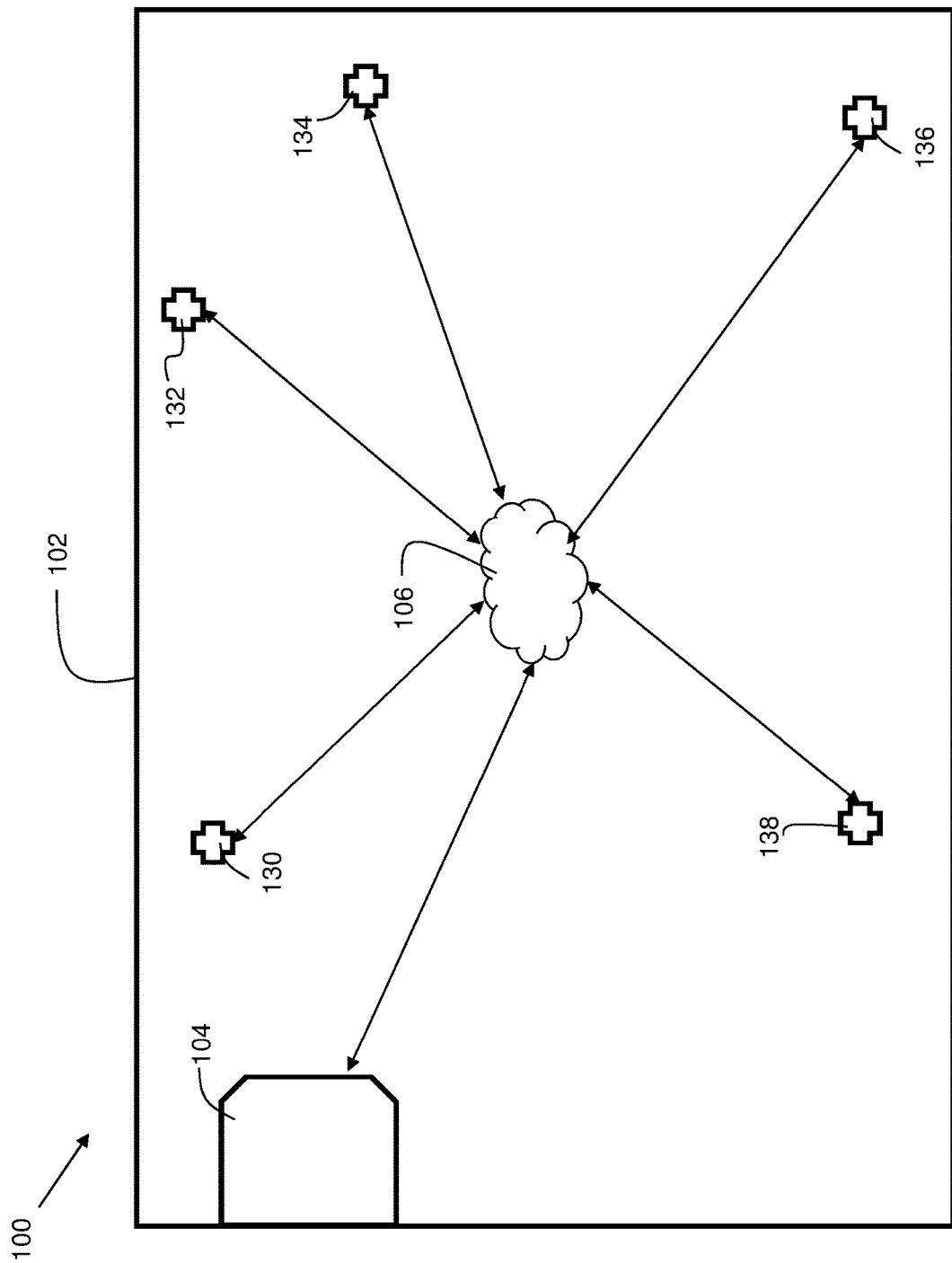
FIG. 1A shows an environment for embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the Figures may be omitted, or illustrated not-to-scale, for illustrative clarity.

DETAILED DESCRIPTION

There is a need for protecting space-confined object-user interactions with systems such as IoT (Internet-of-Things) systems from malicious activities. Encryption is not sufficient because encrypted packets act as inference channels which reveal information by their very presence. That is, even if a packet is encrypted, it could reveal that an exchange during an object-user interaction indicates that the user is actually active in the house, thus helping a burglar plan his crime. Additionally, broadcasting and encryption has the cost of increased power consumption by the nodes.

Disclosed embodiments address the aforementioned concerns and provide techniques for data communication to mobile electronic devices utilizing a plurality of nodes equipped with directional transmitters. Each node is an electronic communication device. The mobile electronic devices are classified as registered or unregistered. A registered device may include a paired device (e.g., Bluetooth® pairing), or device that is authenticated a priori by any other suitable technique. In contrast, an unregistered mobile electronic device is an unknown, or known malicious actor mobile electronic device. A current location for each mobile electronic device in an area is determined. The location may be ascertained using triangulation from RF beacons, Bluetooth, Wi-Fi, or other suitable techniques. A registered mobile electronic device is identified from a group of mobile electronic devices. Based on the determined location, a distance to a registered mobile electronic device from a transmitter is determined. The transmitter is a directional transmitter, capable of transmitting along a sector. A sector corresponding to the registered mobile electronic device based on an angle range and distance from a transmitter to the registered mobile electronic device is determined. A check is made to determine if the sector is a safe sector. In response to determining a safe sector, the transmitter exchanges safe sector information with one or more neighboring transmitters and obtains a count of safe sectors for the registered mobile electronic device. A transmission signal strength is computed based on the distance and the count of safe sectors. Data is then transmitted to the registered mobile device with directed communication using the computed transmission signal strength.

This technique provides at least two important benefits. Firstly, it utilizes constructive interference to provide an optimal transmission signal strength at the location of a registered mobile electronic device with which it is desired to communicate. Other, unregistered mobile electronic devices do not receive a signal with optimal transmission signal strength since those devices are in a location outside of the transmission sectors. In this way, a higher degree of privacy is obtained since radio transmissions are harder to detect and/or demodulate outside of the transmission sectors. Another benefit is that energy in the transmission nodes is conserved, since the transmission energy requirements are considerably lower with constructive interference from multiple nodes, as compared to a single node performing the transmission.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

Directional antennae are used extensively to restrict the transmission of a wave to a specific direction for several reasons such as security, transmission efficiency, reducing noise etc. Embodiments can include various types of directional antennae types such as mechanically driven antennae where direction is controlled by motors, and/or phased-array antennae in which phase-controlled wavelets interfere to produce an amplified wave in one direction, while destructively interfering with transmissions in other directions. A phased array antenna is composed of multiple radiating elements, where each radiating element includes a phase shifter. Beams are formed by shifting the phase of the signal emitted from each radiating element, to provide constructive/destructive interference to steer the beams in the desired direction.

Embodiments may include digital beam forming (DBF). DBF can be implemented at an element level or at a sub-array level. In a DBF-architecture, there can be multiple digital receivers, one own receiver at each of the radiating elements of the antenna. The down-converting to an intermediate frequency and digitizing the signals may be performed at each individual antenna element. Phased-array and/or DBF technology are used in embodiments of the present invention to provide directional radio signals. However, other suitable techniques now known or hereafter developed may be used in embodiments of the present invention.

FIG. 1A shows an environment 100 for embodiments of the present invention. Room 102 has nodes (also referred to herein as "transmitters") 130, 132, 134, 136, and 138 therein. Nodes are directional transmitters capable of transmitting along a sector. Object tracker 104, also located in the room, can communicate via network 106 with nodes 130-138. In embodiments, object tracker 104 may include one or more cameras, LiDAR, radar, ultrasound, infrared, and or other sensors, antennas, transmitters, receivers, and circuitry for tracking and/or recording objects such as persons moving about in an area such as room 102. Network 106 is the Internet, a wide area network (WAN), local area network (LAN), or other suitable network. The communication could be via Bluetooth Low Energy (BLE), Zigbee, Thread, or other wireless system.

Many of such standards produce decentralized "mesh" networks where each device can communicate directly with any other device within range. If a first device is too far apart from a second device, their signals can hop along intermediate devices to get to one another. Devices can enter in and drop out of the network without affecting the network's overall strength. Such networks typically also utilize a "primary" device that acts as a network controller. If the primary device drops out of service, another device can usually take over. Interfaces with smartphones or tablets can be handled by hubs, commercially available devices that are often compatible with two or more of these standards, as well as with Wi-Fi or Bluetooth. Two of the leading hubs, Samsung SmartThings and the Wink 2, can not only receive Zigbee, Z-Wave, Bluetooth, and Wi-Fi, but also allow a user to link smart devices together, so that one will activate when another meets certain conditions. Note that the terms "SAMSUNG, BLUETOOTH, SMARTTHINGS, ZIGBEE, and WINK 2" may each be subject to trademark rights in various jurisdictions throughout the world. Each is used here only in reference to the products or services properly denominated by the mark to the extent that such trademark rights may exist.

Figure 1B:
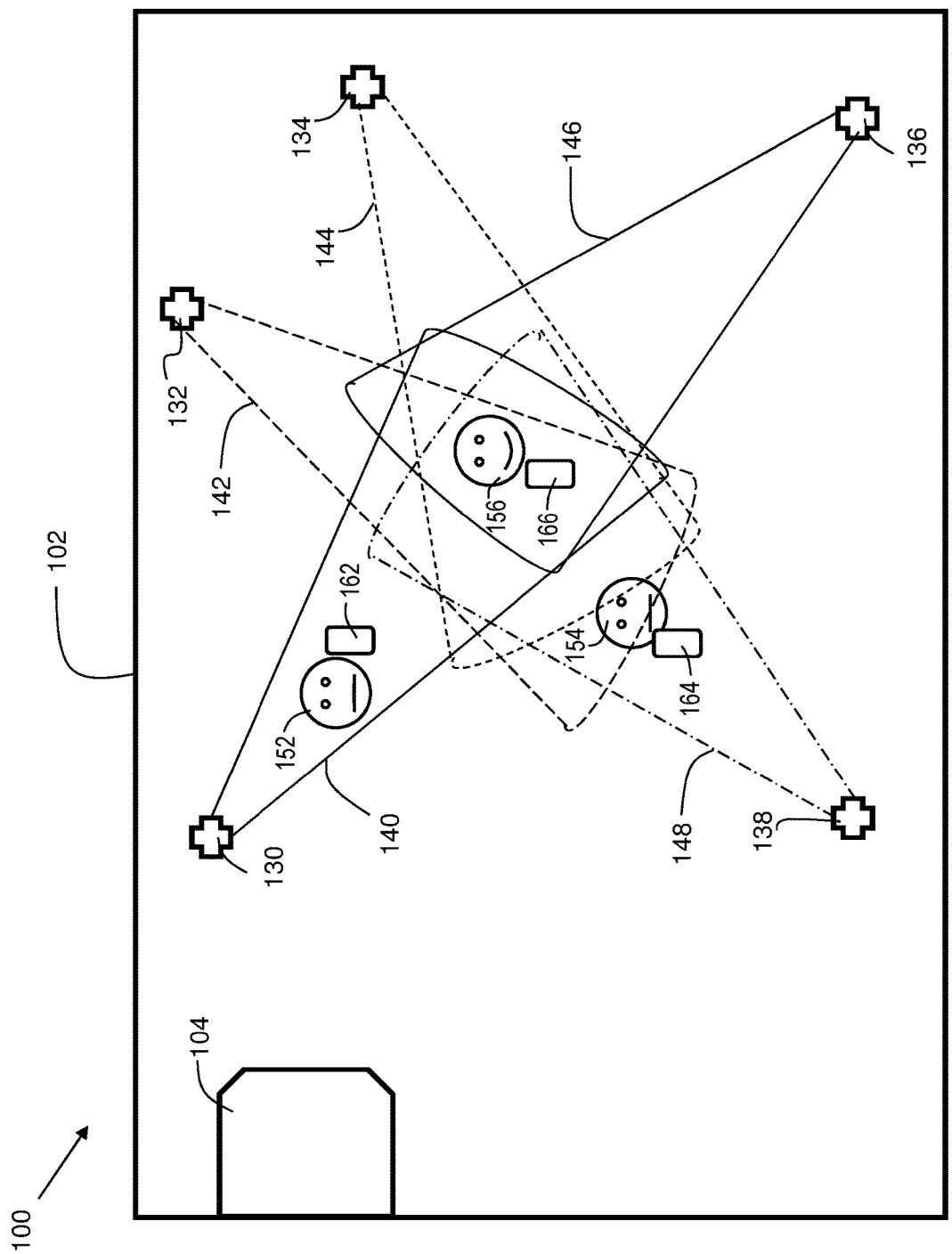
FIG. 1B shows an example of directional transmission to a registered user and two unregistered users.

FIG. 1B shows an example of directional transmission to a registered user and two unregistered users. The system tracks the trajectories of mobile devices in the room using active (participating users) and passive (for adversarial or non-participating users) methods. The mobile electronic devices are classified as registered or unregistered. A registered device may include a paired device (e.g., Bluetooth™ pairing), or a device that is authenticated a priori by any other suitable technique. In contrast, an unregistered mobile electronic device is an unknown, or known malicious actor mobile electronic device. User trajectories are classified as Registered (R) and Unregistered (U). Unregistered users could be further classified (as strangers, malicious, known-but-not-registered, friend, etc.) based on the profile learned by the system. Classification can be performed by semi-supervised learning methods which attempt to cluster user profiles discovered from sensors and voluntary disclosure according to known classes.

Using the profile of unregistered users, the sensitivity of the security apparatus is determined on a scale of high to low using a predefined granularity. Using the sensitivity parameter, the registered user and unregistered user distribution, and the node distribution, nodes coordinate amongst themselves to discover safe sectors (compute the sector width, sector direction and range of transmission) which is then finally used as the communication solution (using a combination of directional antennae and constructive interference) to communicate with the registered users exclusively (or with high fidelity) while unregistered users either cannot receive the transmission or receive it at low fidelity depending upon the security sensitivity parameter.

In the example shown, User 156 is a registered user having mobile device 166. User 152 is an unregistered user having mobile device 162, and user 154 is an unregistered user having mobile device 164. Node 130 emits a signal along sector 140. Node 132 emits a signal along sector 142. Node 134 emits a signal along sector 144. Node 136 emits a signal along sector 146. Node 138 emits a signal along sector 148.

A current location for each mobile electronic device in an area is determined. The location may be ascertained using triangulation from RF beacons, Bluetooth, Wi-Fi, or other suitable techniques. A registered mobile electronic device is identified from a group of mobile electronic devices. Based on the determined location, a distance to a registered mobile electronic device from a transmitter is determined. The location of the unregistered users may be tracked passively based on periodic radio communications from the unregistered mobile electronic devices and/or tracking/identification of users via object tracker 104. In embodiments, there can be multiple object trackers (104) tracking from various locations/angles, though only one is shown here. In some embodiments, facial recognition may also be used in tracking registered/unregistered users.

Location and trajectory identification methods could include listening for beacons, location sensors (GPS), and/or inertial sensor reports (dead-reckoning) from mobile electronic devices, while passive methods could involve techniques that estimate user trajectories from their movement as detected in a camera feed.

Figure 1C:
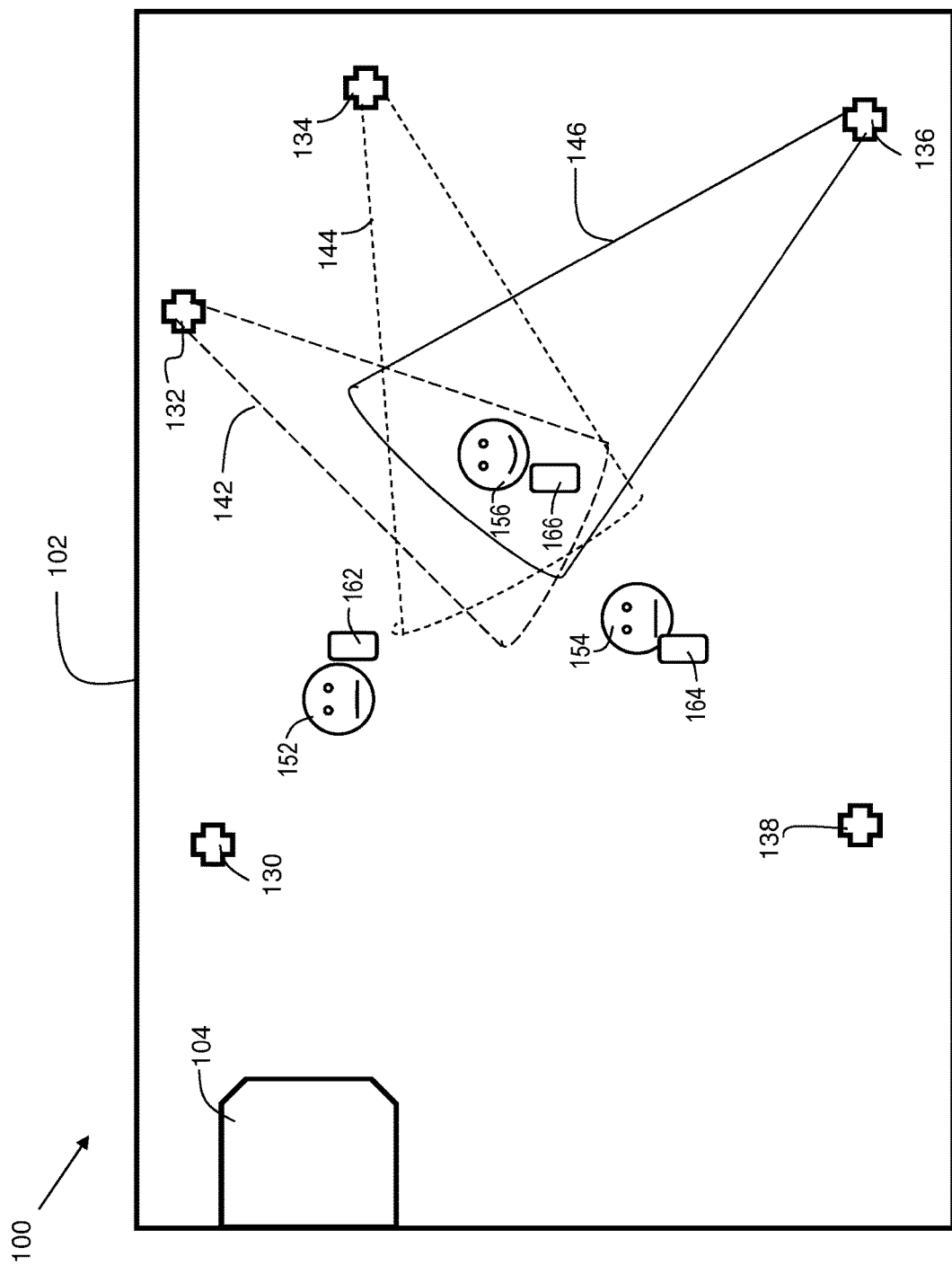
FIG. 1C shows an example of directional constructive interference with safe sectors.

FIG. 1C shows an example of directional constructive interference with safe sectors. This phenomenon occurs when two transmitting sources "sync" their transmission such that the transmitted waves of intensity $I_1$ and $I_2$ constructively interfere and combine to produce a resultant wave of intensity $(I_1+I_2)$ at the receiving end. This phenomenon is used by making several weak directional transmission sources to combine and synchronize their transmission so as to produce an improved signal quality at the receiver. In the example here, the sectors are unimpeded by unregistered users, and are thus referred to as "safe sectors." Only registered user 156 with mobile device 166 is within the sectors 142, 144, and 146.

Figure 1D:
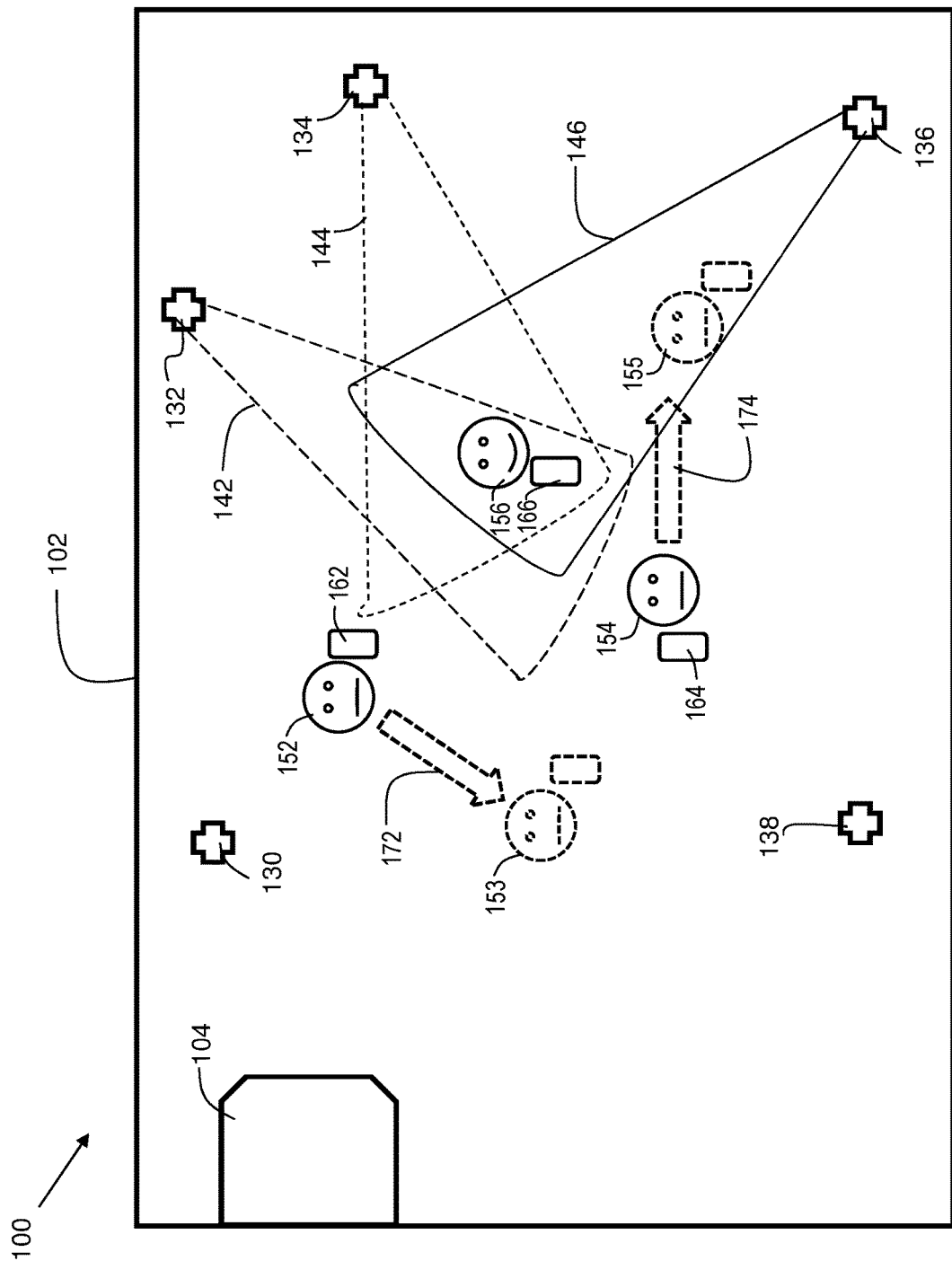
FIG. 1D shows an example of motion estimation in accordance with embodiments of the present invention.

FIG. 1D shows an example of motion estimation in accordance with embodiments of the present invention. Some embodiments include estimating a future location for a registered mobile electronic device. A future sector corresponding to the registered mobile electronic device at the future location is determined based on an angle range and distance from a transmitter to the registered mobile electronic device. In response to determining that the future sector is a safe sector, data is continued to be transmitted with directed communication within the future sector.

A safe sector is a sector that only includes a registered user mobile electronic device, and no unregistered user mobile electronic device. There are three safe sectors here—142, 144, and 146. Each respective node 132, 134, and 136 can transmit signal to registered user 156 via mobile device 166 as no unregistered user is also within each respective area of signal transmission. However, this is only for a moment in time. People move about in the course of their day. In some embodiments, the movement of a mobile device may be tracked. It may be triangulated via beacons, tracked using video camera, or tracked with GPS, GLONASS or other suitable system.

For example, some embodiments include identifying a user corresponding to a current location of the registered mobile electronic device in a camera feed, where the camera feed can include a plurality of digital images. A motion vector is computed based on multiple video frames within the camera feed. The future location is estimated based on the computed motion vector. Based on the tracked movement, future safe sectors may be predicted. In the example, object tracker 104 includes a camera that captures a video feed in the room 102 to obtain digital images and/or video frames used for motion estimation. Unregistered user 152 having mobile device 162 is predicted to move in the direction of vector 172 to the location shown at 153. Unregistered user 154 having mobile device 164 is predicted to move in the direction of vector 174 to the future location shown at 155.

Figure 1E:
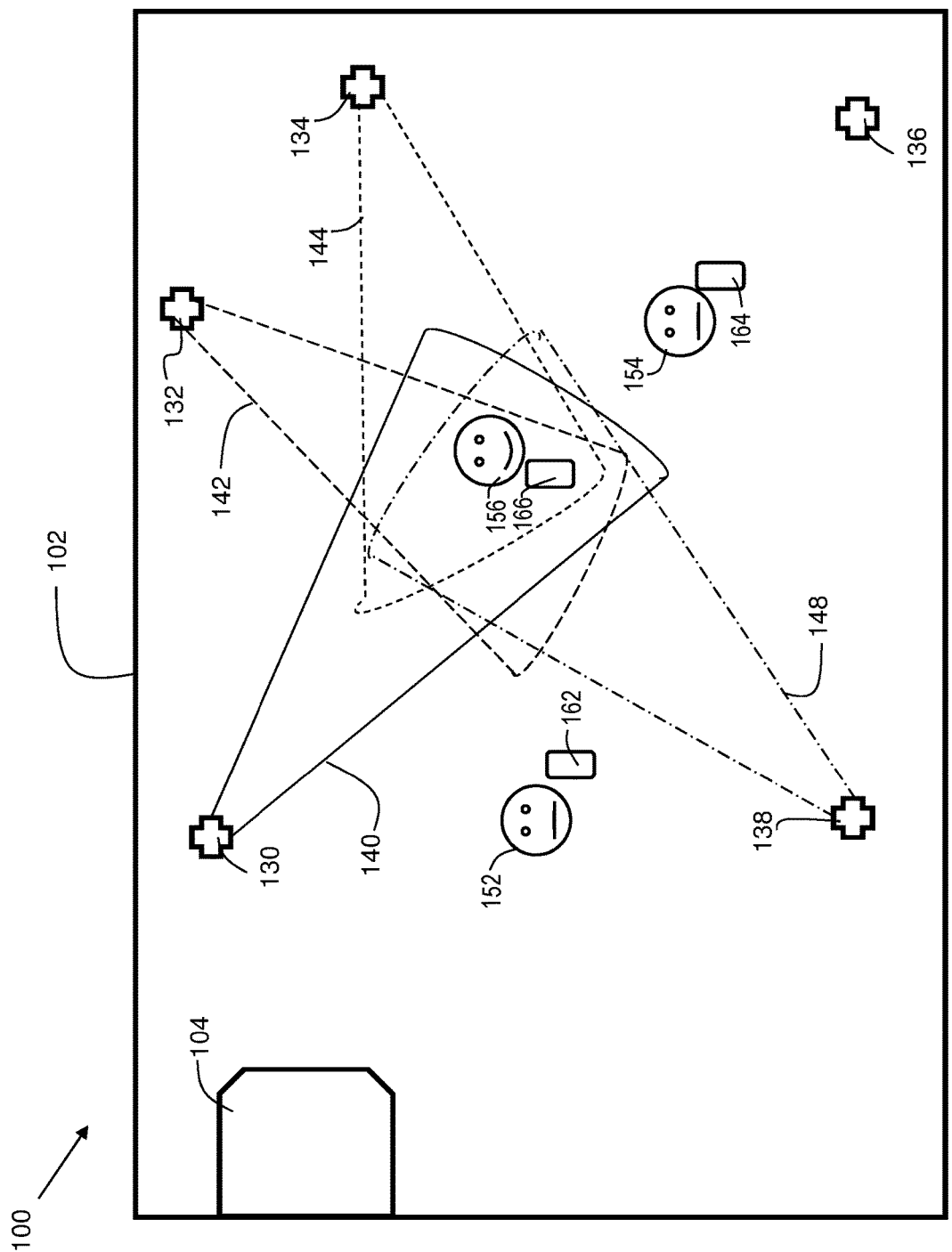
FIG. 1E shows an example of future safe sectors based on motion estimation.

FIG. 1E shows an example of future safe sectors based on motion estimation. In the example here, unregistered user 152 and unregistered user 154 have each moved with their mobile devices to the predicted future locations. Sector 142 and sector 144 are each still safe sectors with only user 156 having mobile device 166 therein. Sector 140 is now a safe sector like sectors 142 and 144, as unregistered user 152 moved out of the range of transmission of node 130. Sector 148 is now a safe sector as unregistered user 154 moved out of the range of transmission of node 138. Sector 146, previously emitting from node 136, is not shown as it is now unsafe with unregistered user 154 in the range of transmission.

Figure 2:
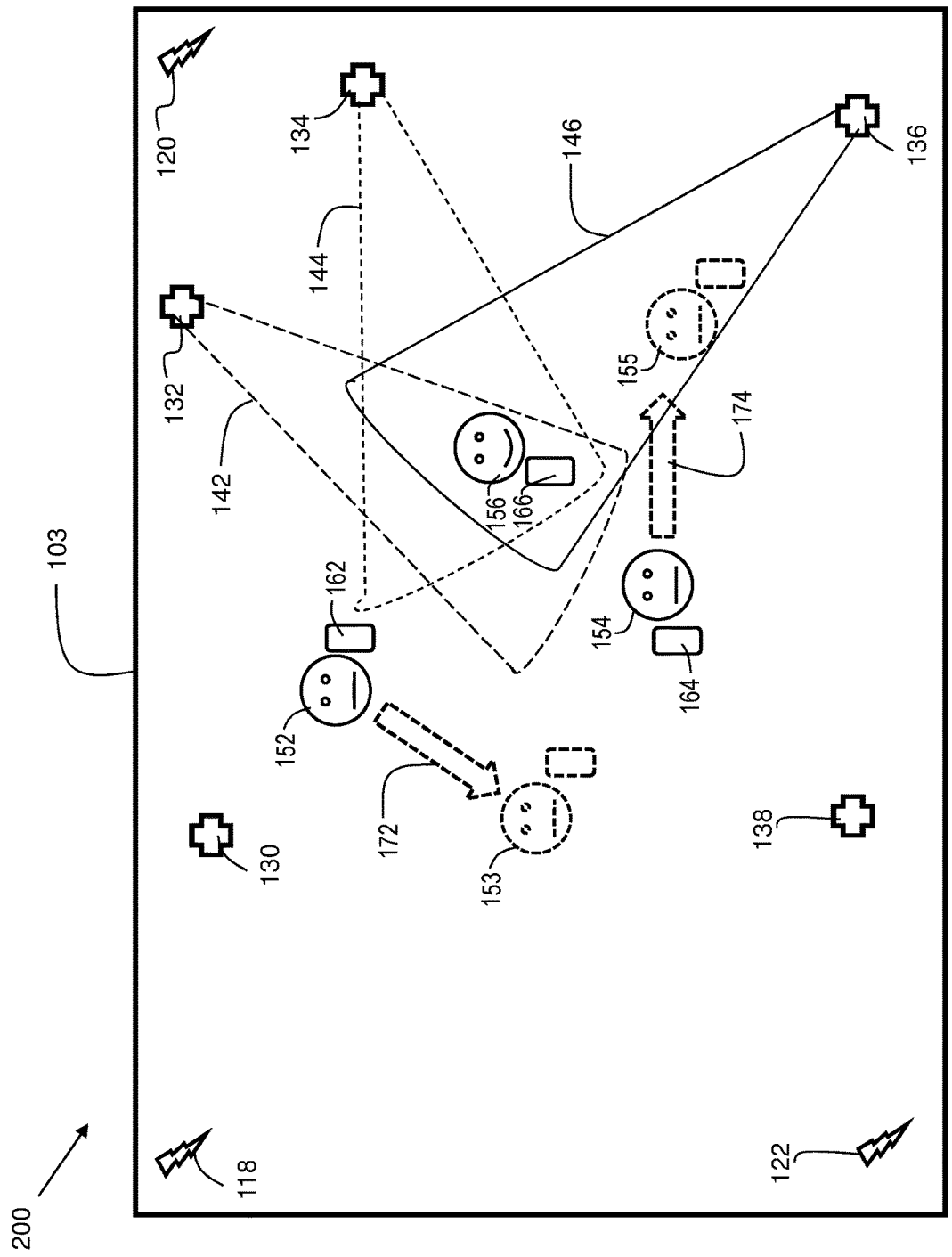
FIG. 2 shows an embodiment utilizing an indoor positioning system.

FIG. 2 shows an embodiment utilizing an indoor positioning system. The indoor positioning system (IPS) allows a mobile device, being carried with or worn by a user, to determine its position within the venue 103. In embodiments, multiple wireless transmitters 118, 120, and 122 are situated within venue 103. The wireless transmitters may be radio frequency (RF) beacons, Wi-Fi transmitters, Bluetooth transmitters, or other suitable protocol. Some embodiments include computing a motion vector based on received radio frequency (RF) signals from the registered mobile device. The future location is estimated based on the computed motion vector. Based on the tracked movement, future safe sectors may be predicted.

When a user enters the venue 103, his/her mobile device makes a location assessment within the venue by use of the wireless transmitters. The location assessment may be accomplished by triangulation, beacon proximity, or other technique via indoor positioning system transmitters 118, 120, and 122. Based on the beacon interactions with mobile device 162, unregistered user 152 is predicted to move in the direction of vector 172 to the location shown at 153. Based on the beacon interactions with mobile device 162, unregistered user 154 is predicted to move in the direction of vector 174 to the future location shown at 155.

Figure 3:
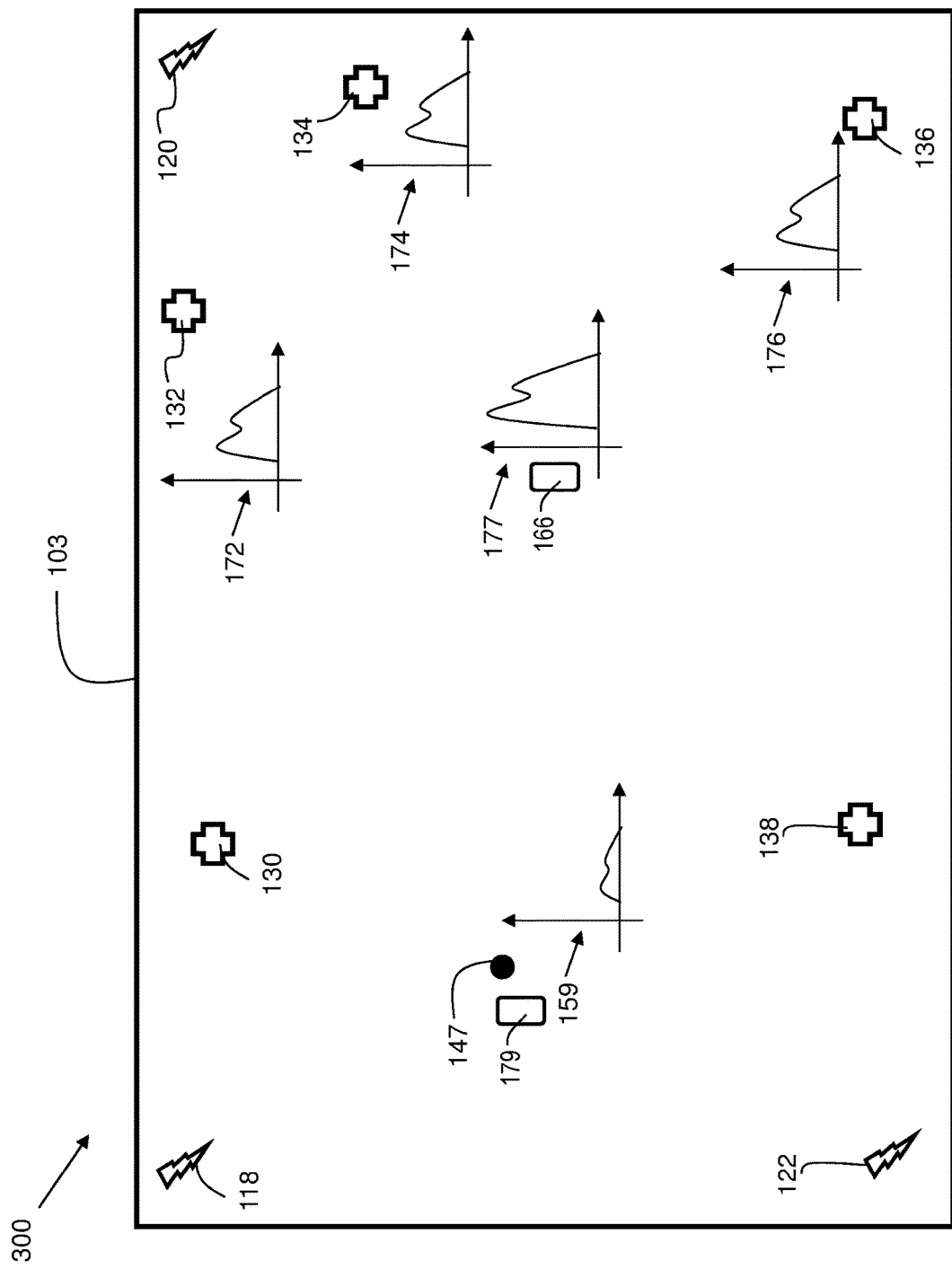
FIG. 3 shows example signal strength at various locations in accordance with embodiments of the present invention.

FIG. 3 shows example signal strength at various locations in accordance with embodiments of the present invention. Signal strength at various locations is represented by graphs 172, 174, 177, 176, and 179. At position 147, graph 159 shows a very weak signal. Graph 177 shows a strong signal due to constructive interference, contributed by each node 132, 134, and 136 having weaker directional signals 172, 174, and 176 respectively. These combine to make the signal illustrated at 177 that can be successfully received at device 166. At position 147, the signal is imperceptible or very weak, such that a mobile electronic device 179 located near position 147 cannot successfully receive the signal indicated by graph 179.

Note that while the embodiments shown in FIGS. 1-3 utilize object trackers that may include cameras and/or other optical and/or electromagnetic-based tracking, other technologies may be used instead of, or in addition to, optical systems such as cameras and/or indoor positioning systems. Some embodiments may include "smart floors" with floor pressure sensors to measure footsteps and gaits, and/or radio signal strength from Wi-Fi, Bluetooth, Bluetooth Low Energy (BLE), Zigbee, Thread, and/or other wireless communication protocols.

Figure 4:
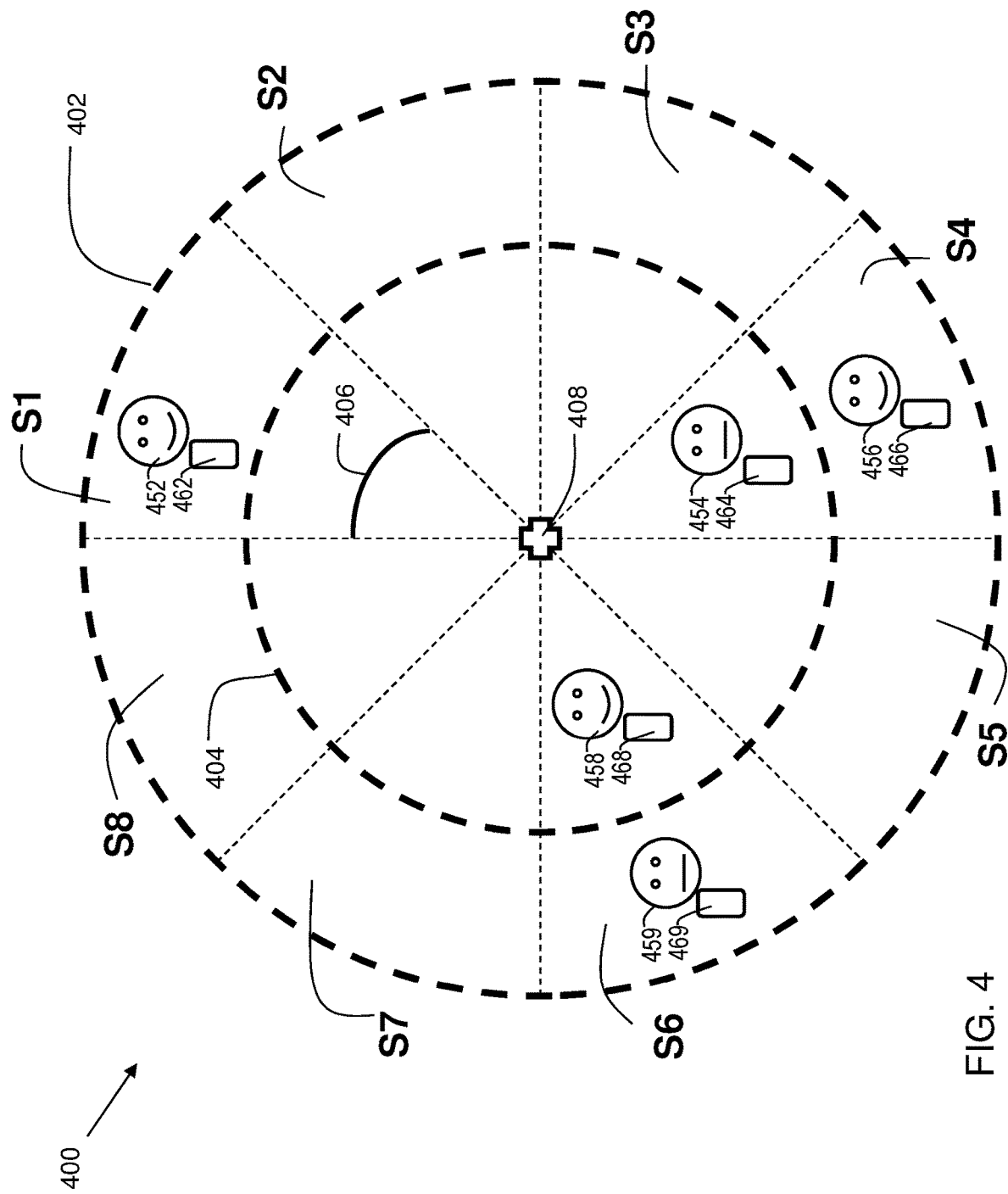
FIG. 4 illustrates multiple sectors corresponding to a transmitter node.

FIG. 4 is a diagram 400 showing multiple sectors corresponding to a transmitter node. The sectors are labeled S1, S2, S3, S4, S5, S6, S7, and S8. The sectors represent signal emitted by node 408. Signal transmission ranges are represented by line 404 (lower range) and line 402 (higher range). Angle 406 of the signal transmission may be adjustable in some embodiments. This may be to make the signal coverage narrower to provide more focus/privacy with less coverage/QoS, or wider to do the opposite. It is a tradeoff, set in part from QoS and/or privacy settings based on the type of data being transmitted.

In the example of FIG. 4, signal strength can be adjusted. S1 is a safe sector with registered user 452 therein with mobile device 462. Even though a registered user 456 with mobile device 466 is within transmission range indicated by line 402, S4 is not a safe sector since mobile device 464 of unregistered user 454 is within transmission range indicated by line 404 and the signal cannot be adjusted to avoid it. S6 is a safe sector, but the node has to lower its power to the lower level represented by range indicated by line 404 so that mobile device 469 of unregistered user 459 does not receive the signal. Additionally, in embodiments, the sector angle 406 may be adjustable. By making sector angle 406 narrower, the directional signal is more focused, and the opportunity for an unregistered user to detect the signal is reduced.

Figure 5A:
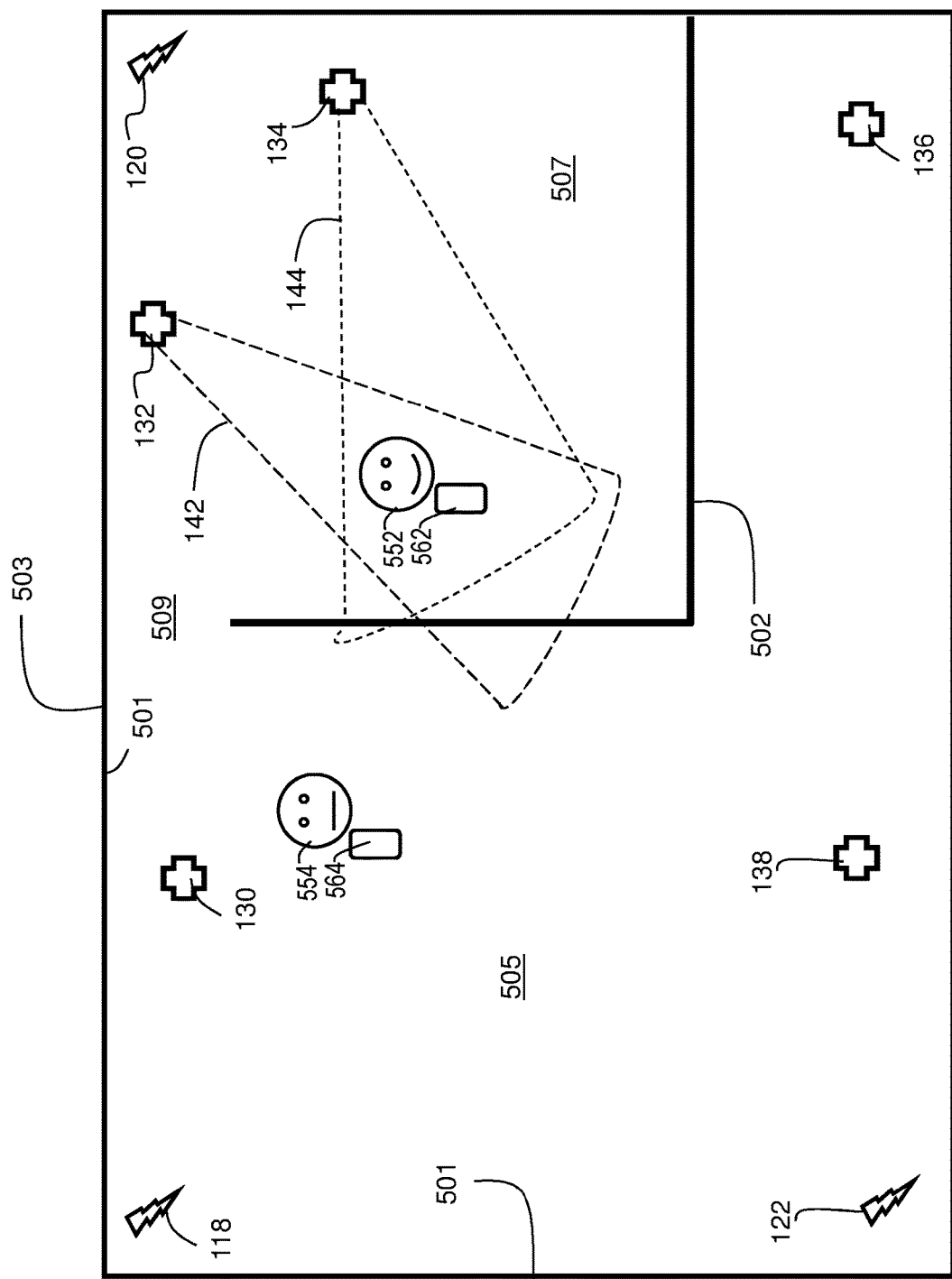
FIG. 5A shows an embodiment of the present invention utilizing floorplan data.

FIG. 5A shows an embodiment of the present invention utilizing floorplan data. Some embodiments include obtaining floorplan data for an area containing the current location of the registered mobile electronic device. In room 503, the floorplan is shown having an outer perimeter wall 501 and a wall 502 dividing the space. Nodes 130, 138, and 136 are in a first section 505 of the space, and nodes 132 and 134 are in a second section 507 of the space. Unregistered user 554, with mobile device 564, is in the first section 505 of the space, and registered user 552, with mobile device 562, is in the second section 507 of the space. Nodes 132 and 134 are emitting signals, making safe sectors 142 and 144, respectively, to mobile device 562 of registered user 552.

Figure 5B:
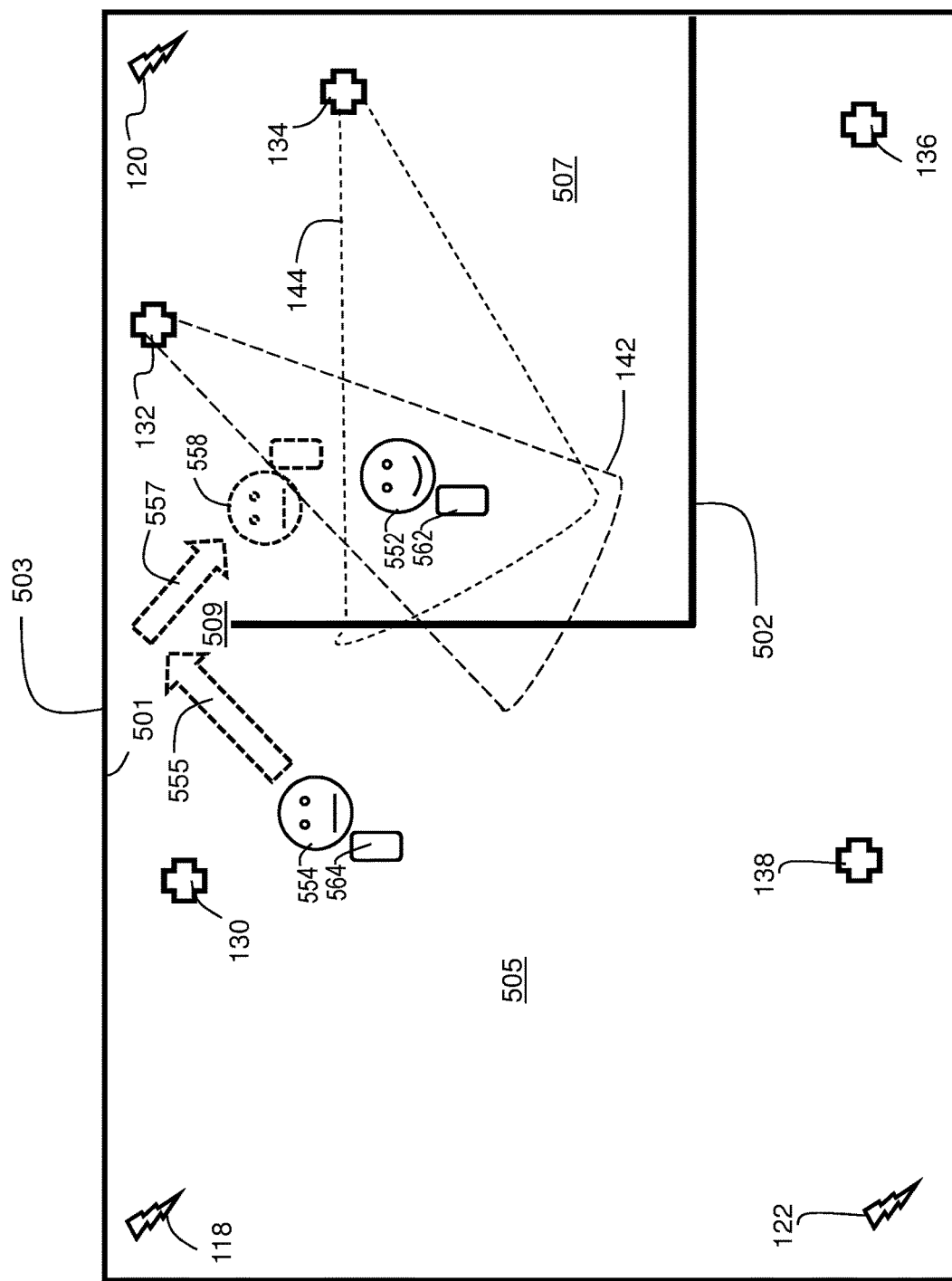
FIG. 5B shows an example of motion estimation incorporating floorplan data.

FIG. 5B shows an example of motion estimation incorporating floorplan data. Unregistered user 554 is moving in the direction of vector 555 toward the doorway 509 between the first section 505 and the second section 507 of the space. In light of the floorplan, it is known that vector 555 can't keep going on forever because of the wall 501 of room 503 that would be in the way. Thus, the estimated future location is constrained, and because of the wall 501, it is logical then that it is likely that the user would come back around the wall along the path formed by vector 557 toward location 558 based on the interior building structure, as described by the floorplan data.

Figure 5C:
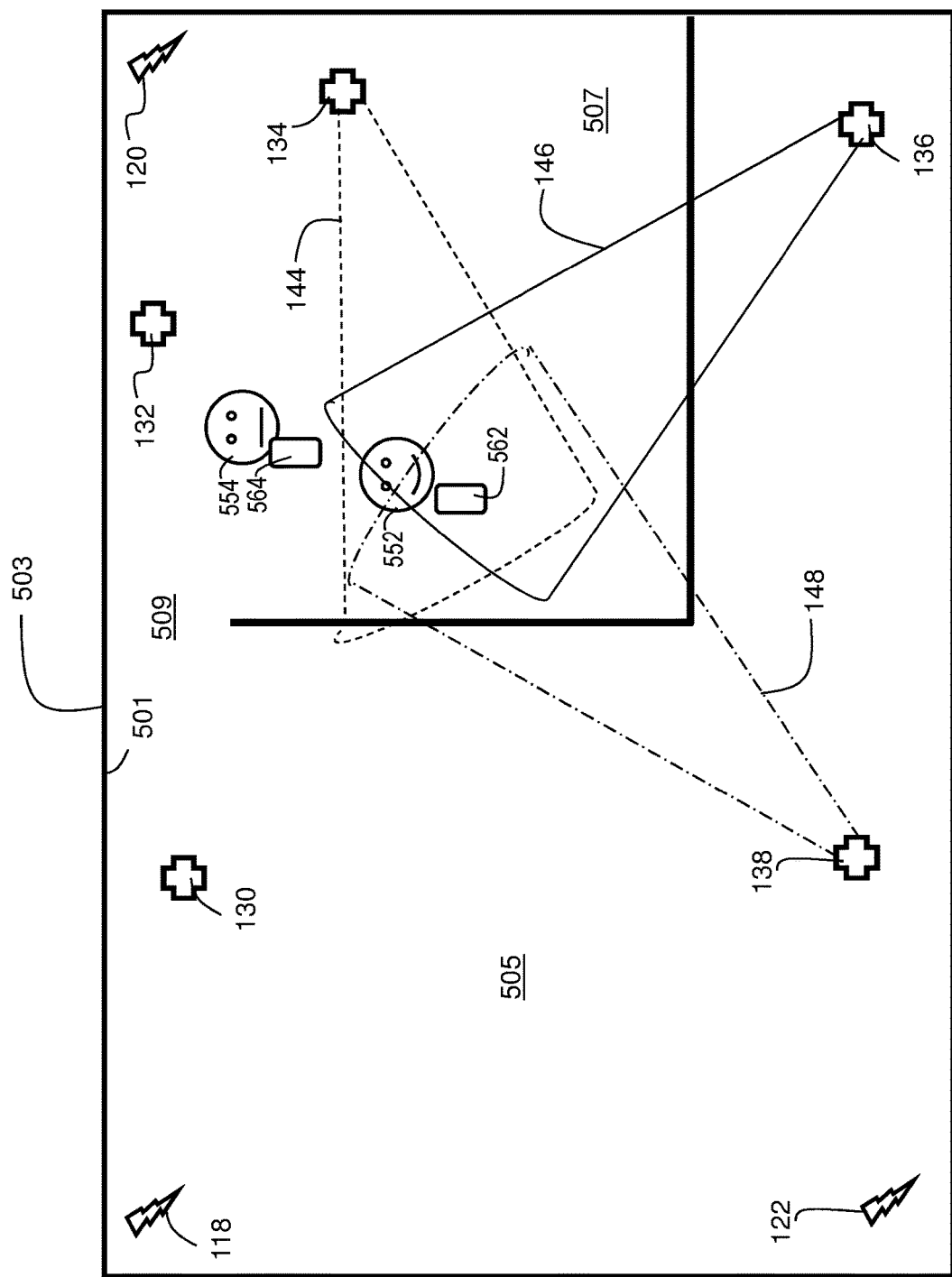
FIG. 5C shows an example of directional constructive interference utilizing motion estimation incorporating floorplan data.

FIG. 5C shows an example of directional constructive interference utilizing motion estimation incorporating floorplan data. Some embodiments include constraining estimated future location based on the floorplan data. In the example, after the unregistered user 554 with mobile device 564 moves, transmitter 132 goes off since it is no longer creating a safe sector 142 (of FIG. 5B), and transmitters 136 and 138 go on, producing safe sectors 146 and 148, respectively. This can be done either when user 554 is detected in that position, or just before s/he gets there, based on motion estimation.

In some embodiments, the floorplan data may include additional information, such as building materials present in the interior space. For example, building materials such as steel can cause RF to behave differently than other materials such as wood, sheetrock, brick, and/or plaster. The type of building materials can affect radio wave propagation. Metal building materials can degrade signal, requiring use of a higher signal strength. Embodiments can include obtaining building material information, and adjusting the computed transmission signal strength based on the obtained building material information. For example, a higher transmission power may be used if the building material is primarily metal, as compared with a building material that is primarily non-metal.

Figure 6:
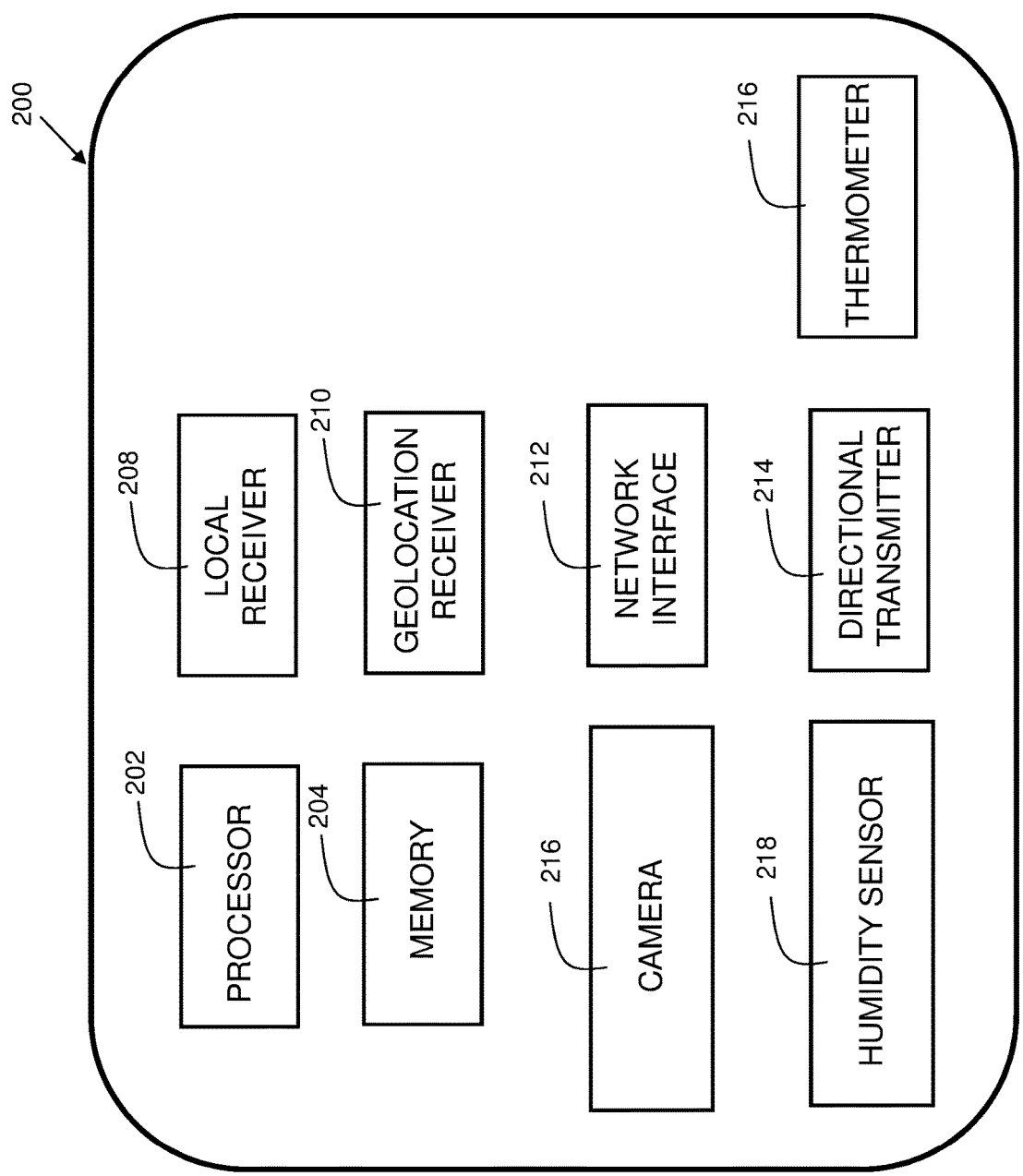
FIG. 6 shows a block diagram of a transmitter node in accordance with embodiments of the present invention.

FIG. 6 is a block diagram of an example of a node 200 used in embodiments of the present invention. Node 200 includes a processor 202, which is coupled to a memory 204. Memory 204 may include dynamic random-access memory (DRAM), static random-access memory (SRAM), magnetic storage, and/or a read-only memory such as flash, EEPROM, optical storage, or other suitable memory. In some embodiments, the memory 204 may not be a transitory signal per se.

Node 200 further includes local receiver 208. This may be for Bluetooth, ZigBee, or other suitable near-field communication system. In some embodiments, multiple RF sources that share spectrum ranges may be detected. In some embodiments, a node may increase signal strength based on the presence of competing transmission sources. As an example, if Wi-Fi and Bluetooth transmission are both detected, then a node using Zigbee may increase signal strength to compensate for potential interference. In some cases, the nodes may alter transmission timing to increase the probability of successful transmission. As an example, a node may monitor a CSMA/CA network (Collision Avoidance) wireless transmission (e.g., Distributed Coordination Function Wi-Fi transmission) and identify interstitial window candidates for node transmission at times when the other RF signals are currently not being transmitted.

Node 200 optionally further includes geolocation receiver 210. This may operate with global positioning satellite systems, such as GPS, GLONASS, Galileo, or other suitable system.

The node 200 further includes a communication interface 212. In embodiments, the communication interface 212 may include a wireless communication interface that includes modulators, demodulators, and antennas for a variety of wireless protocols including, but not limited to, Bluetooth, Wi-Fi, and/or cellular communication protocols for communication over a computer network.

The node 200 may optionally further include a humidity sensor 218. Humidity can affect radio wave propagation. Higher humidity can degrade signal, requiring use of a higher signal strength. Temperature could also be a factor. Very cold temperatures can affect components, necessitating use of higher power. Accordingly, in some embodiments, node 200 may include a thermometer 216 as well.

The node 200 further includes a directional transmitter 214. In embodiments, directional transmitter 214 includes a phased-array antenna system.

Figure 7:
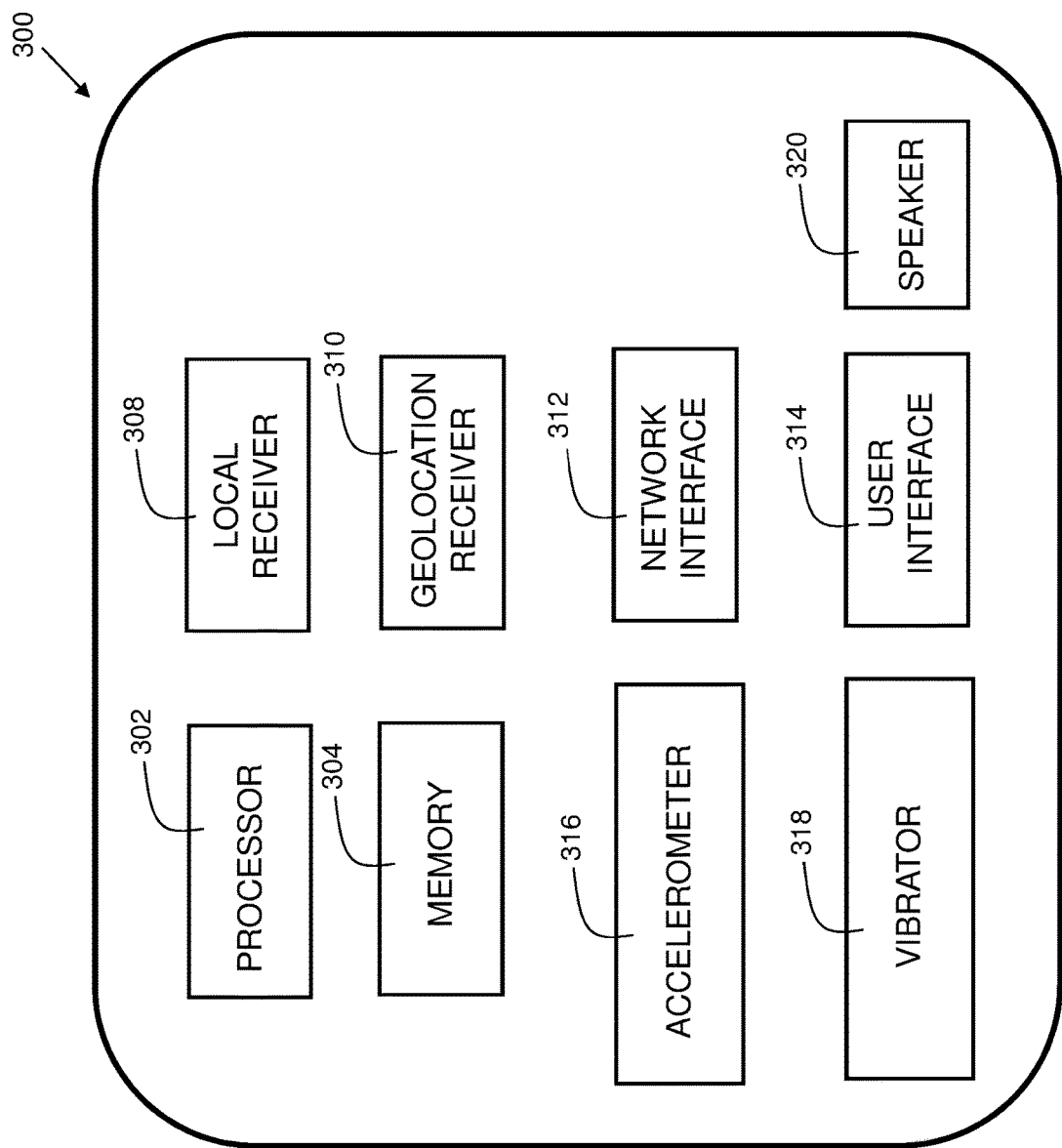
FIG. 7 shows a block diagram of a mobile electronic device in accordance with embodiments of the present invention.

FIG. 7 shows a block diagram of a mobile electronic device 300 in accordance with embodiments of the present invention. The mobile device may be a smartphone or wearable device. Device 300 includes a processor 302, which is coupled to a memory 304. Memory 304 may include dynamic random-access memory (DRAM), static random-access memory (SRAM), magnetic storage, and/or a read-only memory such as flash, EEPROM, optical storage, or other suitable memory. In some embodiments, the memory 304 may not be a transitory signal per se.

Device 300 further includes local receiver 308. This may be for Bluetooth, ZigBee, or other suitable near-field communication system. This may be for device 300 to link with a wearable device in some embodiments.

Device 300 further includes geolocation receiver 310. This may operate with global positioning satellite systems, such as GPS, GLONASS, Galileo, or other suitable system.

The device 300 further includes a communication interface 312. In embodiments, the communication interface 312 may include a wireless communication interface that includes modulators, demodulators, and antennas for a variety of wireless protocols including, but not limited to, Bluetooth, Wi-Fi, and/or cellular communication protocols for communication over a computer network.

Device 300 further includes a user interface 314. This may include a display, touchscreen, keyboard, mouse, or other suitable interface. In some embodiments, the display may be touch-sensitive.

The device 300 may further include an accelerometer 316. The accelerometer may be capacitive, piezoelectric resistive, capacitive spring mass system base, DC response, electromechanical servo based, high gravity, high temperature, a laser accelerometer, or other type now known or hereafter developed. The accelerometer 316 may be used to measure a user's deceleration (or acceleration) while traversing a venue.

The device 300 may further include a vibrator 318. The vibration motor may be a geared motor mechanism, which may have, for instance, an asymmetrical load affixed to a rotating shaft, a linear resonant actuator, or a pancake vibration motor, etc. Accordingly, in some embodiments, the alert includes a tactile alert. The device may vibrate as an alert.

The device 300 may further include a speaker 320. The speaker may be powered or passive. Accordingly, in some embodiments, the alert includes an audible alert. The alert may be a beep, sound effect, song, or other suitable audio.

Figure 8:
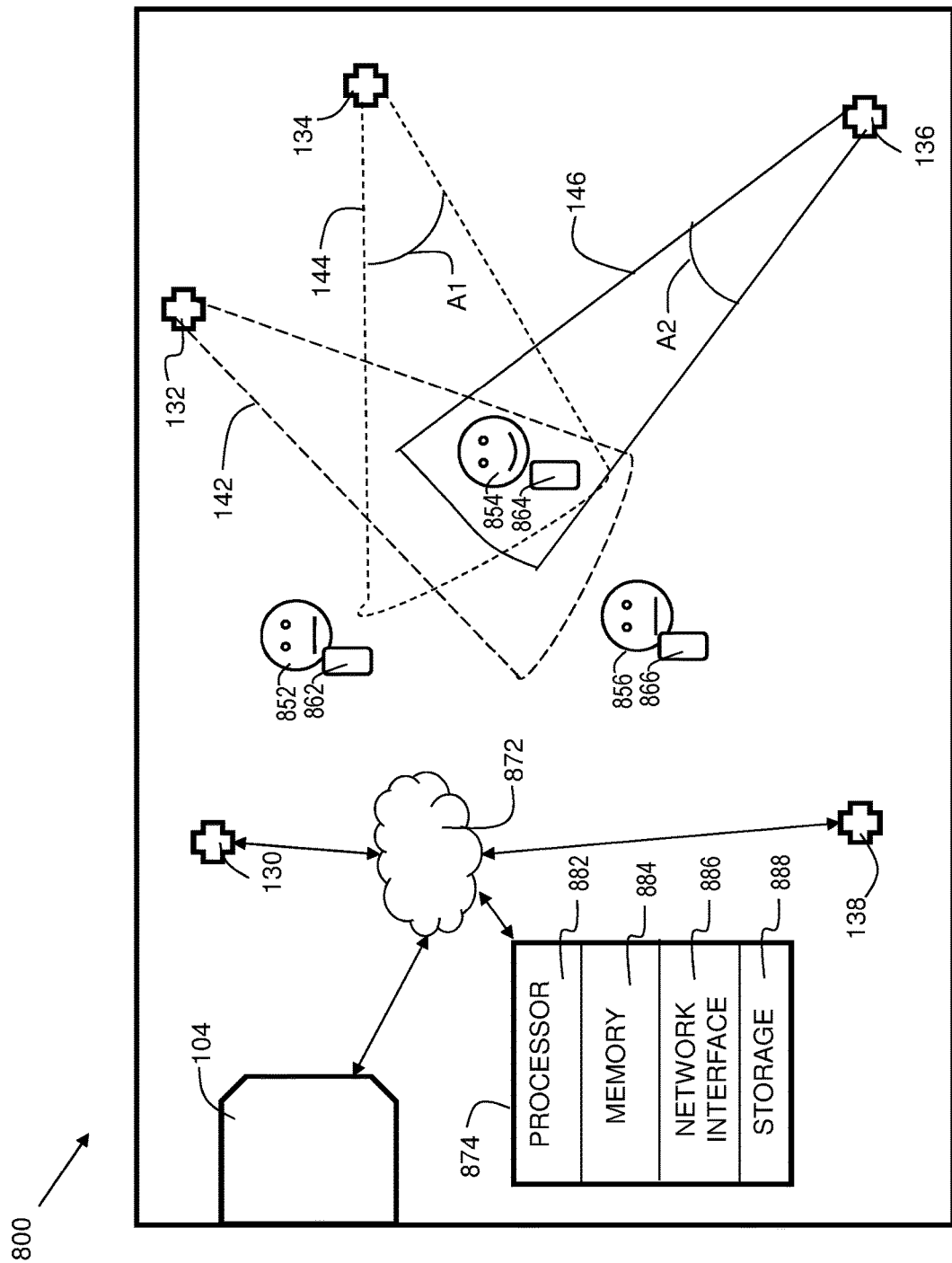
FIG. 8 shows an embodiment of the present invention utilizing a data server.

FIG. 8 shows an embodiment of the present invention utilizing a data server. The data server 874 may include a processor 882, memory 884, network interface 886, and storage 888. The processor 882 is coupled to the memory 884 such that it can access instructions stored in memory 884. The processor 882 executes the instructions in implementations of embodiments of the present invention, such as for performing computations for motion estimation, determining which nodes should transmit, etc. Storage 888 may include one or more hard disks, or other suitable storage technology. The memory 884 and/or storage 888 may store the floorplan data and list of registered mobile electronic devices/users in those embodiments. Note that while one data server is illustrated in diagram 800, in practice, there may be multiple data servers 874 operating in a distributed manner for load balancing and data redundancy.

The data server 874 may be connected to network 872. Network 872 is the Internet, wide area network, local area network, or other suitable network. Object tracker 104 is connected to the network through a data link as well. Each node may be connected to the network 872 to receive instructions from the server 874 regarding when to activate and deactivate transmission, and the appropriate sector direction, sector width (sector angle), and transmission strength. As shown in FIG. 8, node 134 is producing sector 144 with angle A1, and node 136 is producing sector 146 with angle A2, where angle A1>A2. Hence, sector 146 has a narrower range of coverage than sector 144. In some embodiments, each node may compute a sector angle independently of other nodes. Thus, in embodiments, each node may produce a sector with a different sector width. In some embodiments, the sector width and/or sector direction may dynamically change as registered and/or unregistered users move within the area. As depicted in diagram 800, unregistered user 852 is associated with electronic device 862, and unregistered user 856 is associated with electronic device 866. Registered user 854 is associated with electronic device 864. Sectors 142, 144, and 146 are directed towards registered user 854, while the unregistered users 852 and 856 are not receiving the constructive interference combined signal with their respective electronic devices 862 and 866.

Figure 9:
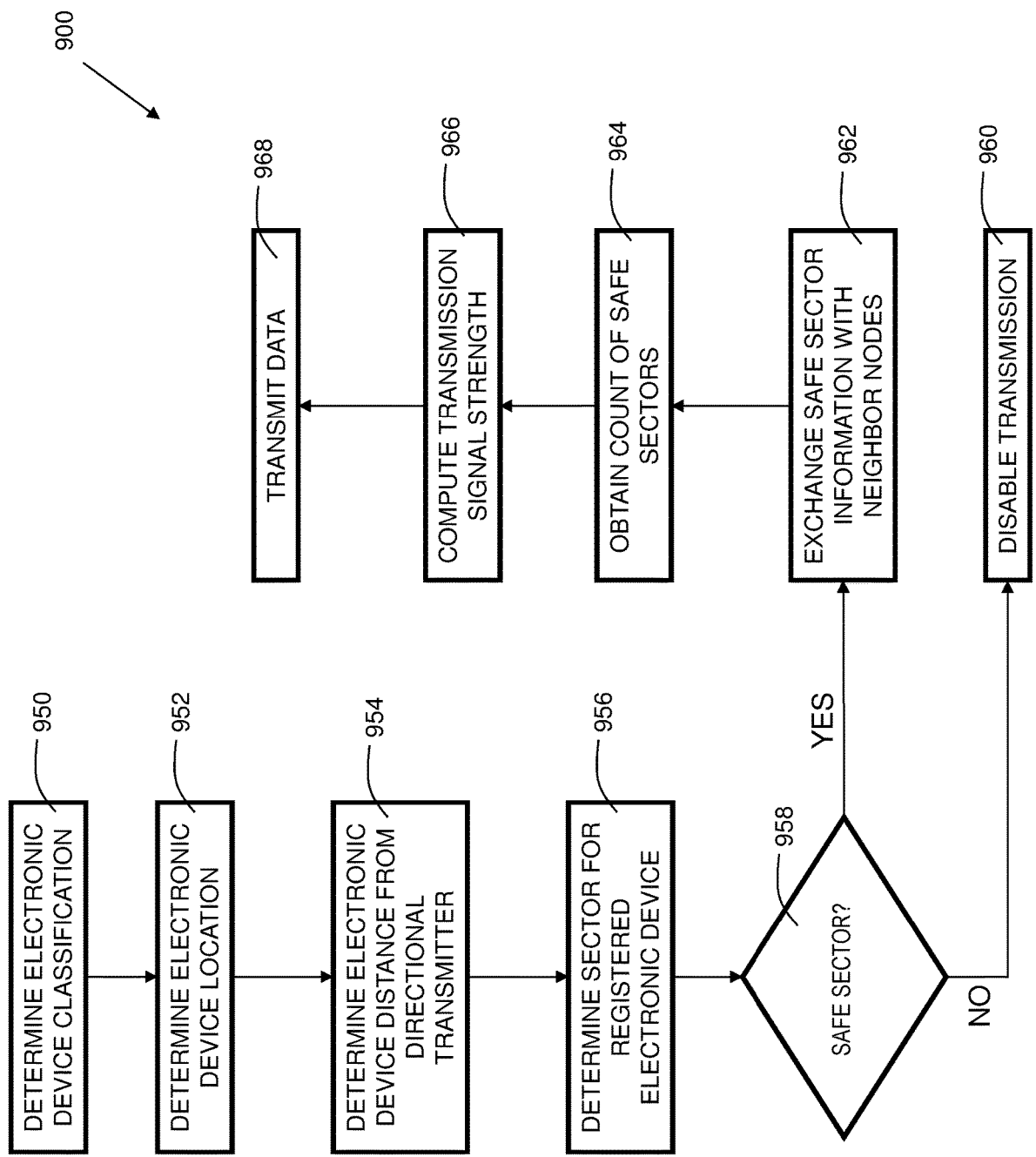
FIG. 9 is a flowchart indicating process steps for embodiments of the present invention.

FIG. 9 is a flowchart 900 indicating process steps for embodiments of the present invention. At 950, an electronic device classification is determined. At 952, an electronic device location is determined. At 954, a distance of the electronic device from a directional transmitter is determined. The nodes communicate with neighbor nodes to announce they have a safe sector, and the other nodes that are going to communicate are notified, such that each node knows how many nodes are participating in the communication. The more nodes that participate, the lower the transmission power for each node is. Each node may further exchange timing information, or synchronize to a unified time source such as GPS time to enable synchronized communication in order to create the constructive interference. At 956, a sector for the registered electronic device is determined. At 958, it is determined whether the sector is unimpeded (a safe sector). If no, transmission is disabled. If yes, safe sector information is exchanged with neighbor nodes via a wireless communication protocol. At 964, a count of safe sectors is obtained. At 966, a transmission signal strength is computed. At 968, data is transmitted to the electronic device location.

Figure 10:
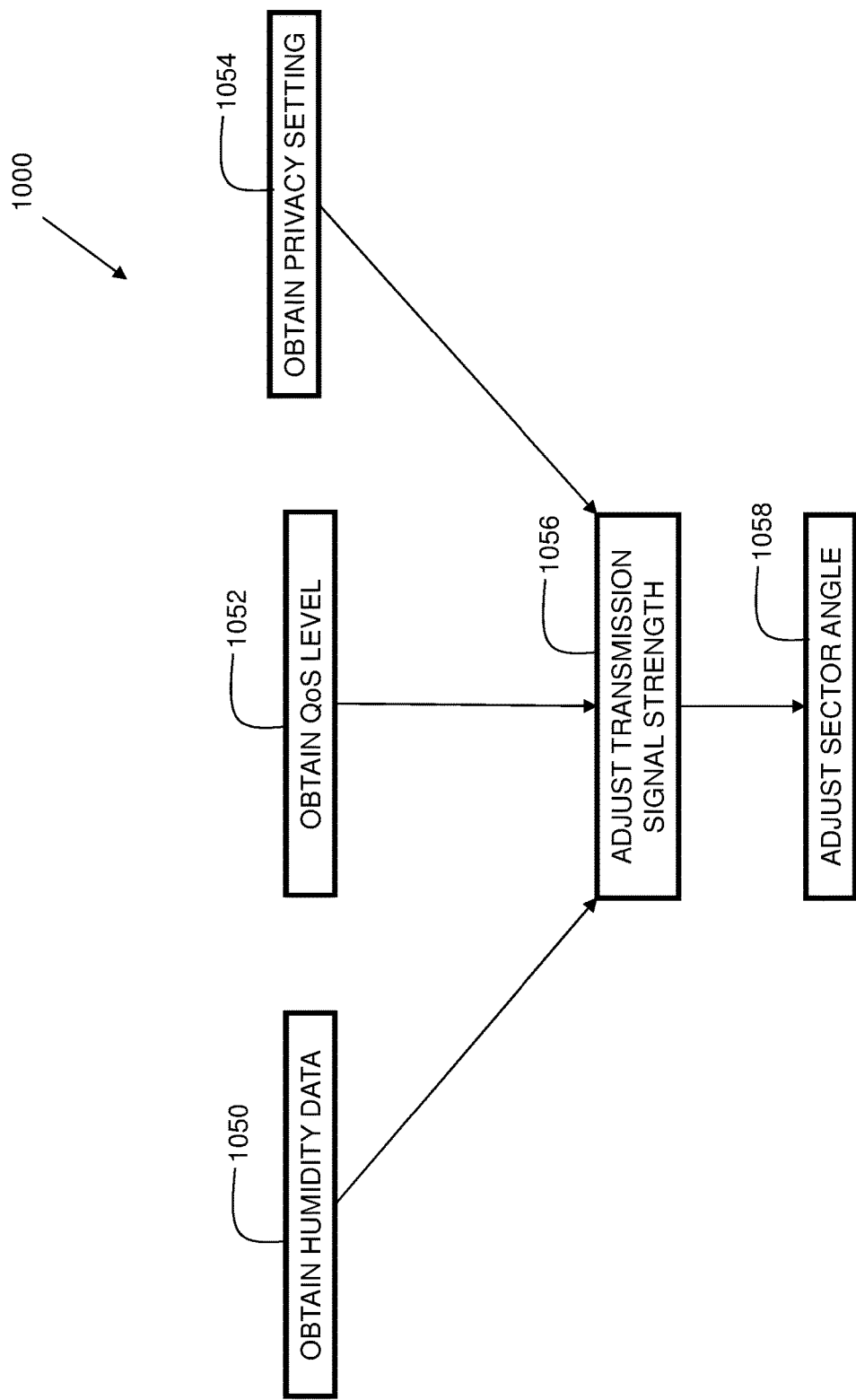
FIG. 10 is a flowchart showing factors for determining transmission signal strength.

FIG. 10 is a flowchart 1000 showing factors for determining transmission signal strength. Embodiments include determining a quality-of-service (QoS) value for the data, at 1052. The computed transmission signal strength is then adjusted based on the QoS value, at 1056. Some data is lossy, such as audio, while others, such as a passcode, must be transmitted lossless. The QoS is a value related to a probability of packet loss, with a higher QoS corresponding to a lower probability of packet loss. Thus, a different QoS could be specified based on the type/category of the data. This means, for example, that for audio, a lower QoS could be established, meaning a few errors could be tolerated. In this case, the nodes may use a lower transmission power, whereas in contrast, with the use case involving a passcode, requiring a higher QoS, the nodes would use a higher transmission power.

Some embodiments include obtaining a privacy setting value for the data, at 1054, and adjusting the transmission signal strength thereon. An angle of the sector is adjusted based on the privacy setting. If the particular data is extremely sensitive/private, it would be prudent to always use safe sectors. For less sensitive data, it may be prudent to try to maintain safe sectors, but allow limited transmission that includes unregistered users.

Some embodiments include obtaining ambient humidity data, at 1050, and adjusting the computed transmission signal strength based on the ambient humidity data.

At 1058, the sector angle is adjusted. For example, a sector can be widened to include coverage over a larger area, even at the risk of including an unregistered user within the sector. A sector having a wider angle such as 35 degrees, as opposed to 20 degrees, will cover more area within its reach. Conversely, in some cases, a sector can be narrowed to reduce risk of including an unregistered user within the sector. A sector that is 45 degrees wide will have a reduced risk of including an unregistered user than a sector that is 90 degrees.

Figure 11:
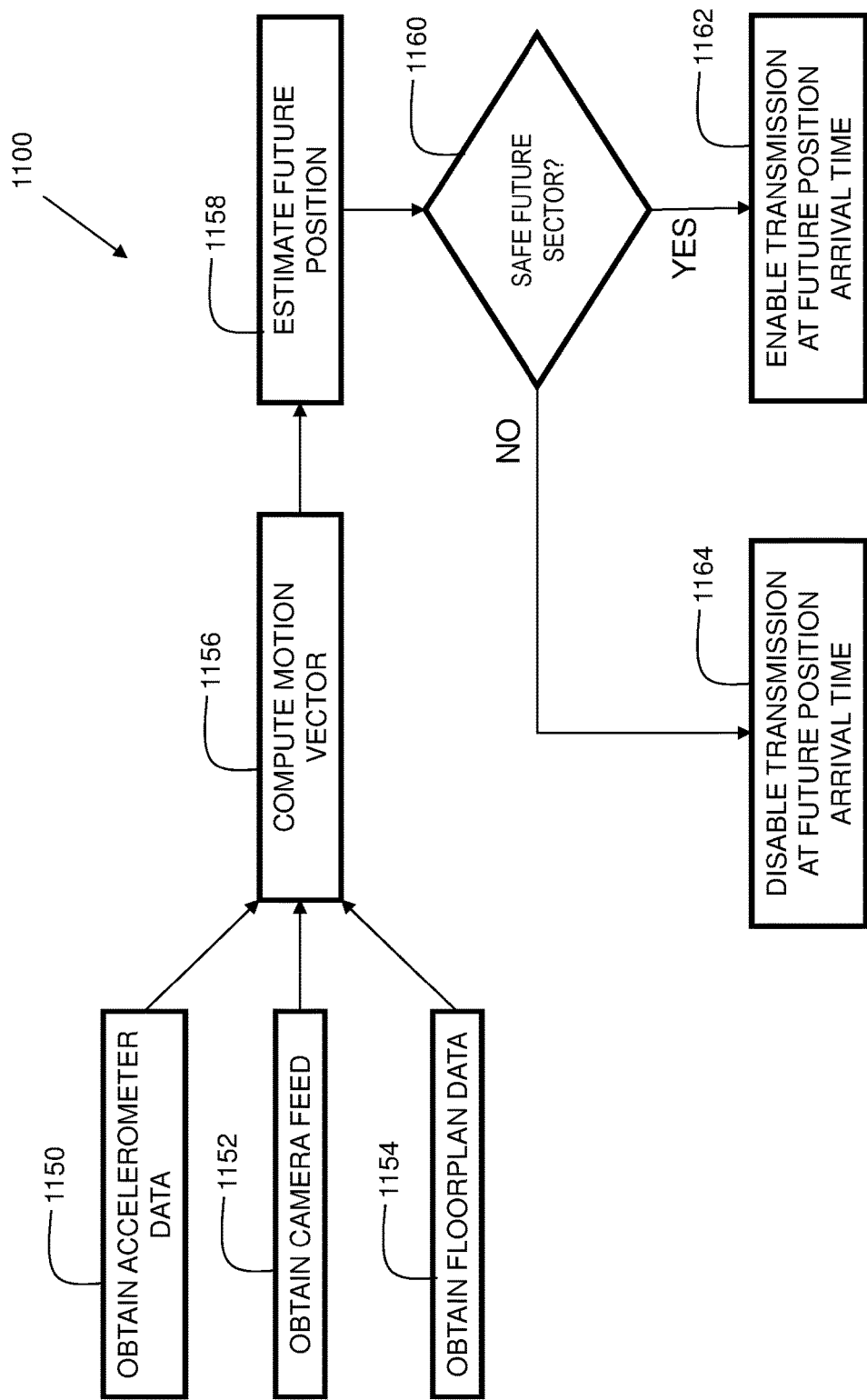
FIG. 11 is a flowchart indicating steps for enabling and disabling transmission based on motion estimation.

FIG. 11 is a flowchart 1100 indicating steps for enabling and disabling transmission based on motion estimation. At 1150, accelerometer data is obtained. At 1152, a camera feed is obtained. At 1154, floorplan data is obtained. At 1156, a motion vector is computed based on the obtained data from 1150, 1152, and 1154. At 1158, a future position is estimated based on the computed motion vector. At 1160, it is determined whether the future sector is a safe sector. If not, transmission is disabled at the future position arrival time. If yes, at 1162, transmission is enabled at the future position arrival time.

As can now be appreciated, disclosed embodiments provide techniques for synchronized directional communication to a mobile electronic device from multiple transmission nodes simultaneously. Safe sectors are identified that include only registered users. Multiple transmission nodes simultaneously transmit in their safe sector to provide constructive interference that creates a clear transmission signal at the location of the registered user, while other, unregistered mobile electronic devices nearby receive a degraded signal or undetectable signal. Thus, with the techniques of disclosed embodiments, privacy is improved. Furthermore, since each node can transmit at a lower power, power consumption of each node is reduced.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for electronic communication, comprising:
   determining a classification for a plurality of mobile electronic devices as registered or unregistered;
   determining a current location for each of the plurality of mobile electronic devices;
   determining a registered mobile electronic device from the plurality of mobile electronic devices;
   determining a distance to the registered mobile electronic device from a transmitter;
   determining a sector corresponding to the registered mobile electronic device based on angle range and distance from the transmitter to the registered mobile electronic device;
   determining if the sector is a safe sector; and
   in response to determining the sector is a safe sector:
      exchanging safe sector information with one or more neighboring transmitters;
      obtaining a count of safe sectors for the registered mobile electronic device;
      computing a transmission signal strength based on the distance and the count of safe sectors; and
      transmitting data to the registered mobile electronic device with directed communication using the computed transmission signal strength.

2. The method of claim 1, further comprising:
   estimating a future location for the registered mobile electronic device;
   determining a future sector corresponding to the registered mobile electronic device at the future location based on angle range and distance from a transmitter to the registered mobile electronic device; and
   in response to determining that the future sector is a safe sector, continuing transmitting data with directed communication within the future sector.

3. The method of claim 2, wherein estimating a future location includes:
   identifying a user corresponding to a current location of the registered mobile electronic device in a camera feed;
   computing a motion vector based on multiple video frames within the camera feed; and
   estimating the future location based on the computed motion vector.

4. The method of claim 3, wherein estimating a future location includes:
   computing a motion vector based on received RF signals from the registered mobile electronic device; and
   estimating the future location based on the computed motion vector.

5. The method of claim 4, further comprising:
   obtaining floorplan data for an area containing the current location of the registered mobile electronic device; and
   constraining the estimated future location based on the floorplan data.

6. The method of claim 5, further comprising:
   obtaining building material information; and
   adjusting the computed transmission signal strength based on the obtained building material information.

7. The method of claim 1, further comprising:
   determining a quality-of-service (QoS) value for data transmitted to the registered mobile electronic device; and
   adjusting the computed transmission signal strength based on the QoS value.

8. The method of claim 1, further comprising:
   determining a privacy setting value for the data; and
   adjusting an angle of the sector based on the privacy setting.

9. The method of claim 1, further comprising:
   obtaining ambient humidity data; and
   adjusting the computed transmission signal strength based on the ambient humidity data.

10. An electronic communication device comprising:
    a processor;
    a directional transmitter coupled to the processor;
    a memory coupled to the processor, the memory containing instructions, that when executed by the processor, perform the steps of:
       determining a classification for a plurality of mobile electronic devices as registered or unregistered;
       determining a current location for each of the plurality of mobile electronic devices;
       determining a registered mobile electronic device from the plurality of mobile electronic devices;
       determining a distance to the registered mobile electronic device from a transmitter;

determining a sector corresponding to the registered mobile electronic device based on angle range and distance from a transmitter to the registered mobile electronic device;

determining if the sector is a safe sector; and in response to determining that the sector is a safe sector:

exchanging safe sector information with one or more neighboring transmitters;

obtaining a count of safe sectors for the registered mobile electronic device;

computing a transmission signal strength based on the distance and the count of safe sectors; and transmitting data to the registered mobile electronic device via the directional transmitter using the computed transmission signal strength.

11. The electronic communication device of claim 10, wherein the memory further comprises instructions, that when executed by the processor, perform the steps of:

estimating a future location for the registered mobile electronic device;

determining a future sector corresponding to the registered mobile electronic device at the future location based on angle range and distance from a transmitter to the registered mobile electronic device; and in response to determining that the future sector is a safe sector, continuing transmitting data with directed communication within the future sector.

12. The electronic communication device of claim 11, wherein the memory further comprises instructions, that when executed by the processor, perform the steps of:

identifying a user corresponding to a current location of the registered mobile electronic device in a camera feed;

computing a motion vector based on multiple video frames within the camera feed; and estimating the future location based on the computed motion vector.

13. The electronic communication device of claim 12, wherein the memory further comprises instructions, that when executed by the processor, perform the steps of:

computing a motion vector based on received RF signals from the registered mobile electronic device; and estimating the future location based on the computed motion vector.

14. The electronic communication device of claim 13, wherein the memory further comprises instructions, that when executed by the processor, perform the steps of:

obtaining floorplan data for an area containing the current location of the registered mobile electronic device; and constraining the estimated future location based on the floorplan data.

15. The electronic communication device of claim 11, wherein the memory further comprises instructions, that when executed by the processor, perform the steps of:

determining a quality-of-service (QoS) value for data transmitted to the registered mobile electronic device; and adjusting the computed transmission signal strength based on the QoS value.

16. The electronic communication device of claim 11, wherein the memory further comprises instructions, that when executed by the processor, perform the steps of:

determining a privacy setting value for the data; and adjusting an angle of the sector based on the privacy setting.

17. The electronic communication device of claim 11, wherein the memory further comprises instructions, that when executed by the processor, perform the steps of:

obtaining ambient humidity data; and adjusting the computed transmission signal strength based on the ambient humidity data.

18. The electronic communication device of claim 11, wherein the memory further comprises instructions, that when executed by the processor, perform the steps of:

obtaining building material information; and adjusting the computed transmission signal strength based on the obtained building material information.

19. The electronic communication device of claim 11, wherein the directional transmitter includes a phased array antenna.

20. A computer program product for an electronic communication device comprising a computer readable storage medium having program instructions embodied therewith, the program instructions executable by a processor to cause the electronic communication device to perform the steps of:

determining a classification for a plurality of mobile electronic devices as registered or unregistered;

determining a current location for each of the plurality of mobile electronic devices;

determining a registered mobile electronic device from the plurality of mobile electronic devices;

determining a distance to the registered mobile electronic device from a transmitter;

determining a sector corresponding to the registered mobile electronic device based on angle range and distance from a transmitter to the registered mobile electronic device;

determining if the sector is a safe sector; and in response to determining that the sector is a safe sector:

exchanging safe sector information with one or more neighboring transmitters;

obtaining a count of safe sectors for the registered mobile electronic device;

computing a transmission signal strength based on the distance and the count of safe sectors; and transmitting data to the registered mobile electronic device with directed communication using the computed transmission signal strength.

* * * * *